United States Patent
Kristensen (10) Patent No.: US 11,499,530 B2
(45) Date of Patent: Nov. 15, 2022

(54) SELF-ALIGNING INTERFACE

(71) Applicant: Vestas Wind Systems A/S, Aarhus N. (DK)

(72) Inventor: Nicolaj Biltoft Kristensen, Silkeborg (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/285,202

(22) PCT Filed: Oct. 9, 2019

(86) PCT No.: PCT/DK2019/050300
§ 371 (c)(1),
(2) Date: Apr. 14, 2021

(87) PCT Pub. No.: WO2020/088724
PCT Pub. Date: May 7, 2020

(65) Prior Publication Data
US 2021/0404440 A1    Dec. 30, 2021

(30) Foreign Application Priority Data
Nov. 2, 2018   (DK) .......................... PA 2018 70721

(51) Int. Cl.
*F03D 15/00* (2016.01)
*F03D 13/10* (2016.01)
(52) U.S. Cl.
CPC ............ *F03D 15/00* (2016.05); *F03D 13/10* (2016.05); *F05B 2230/608* (2013.01); *F05B 2260/30* (2013.01)
(58) Field of Classification Search
CPC .... F03D 15/00; F03D 13/10; F05B 2230/608; F05B 2260/30; F05B 2230/604;
(Continued)

(56) References Cited

U.S. PATENT DOCUMENTS 4,057,946 A * 11/1977 Barrett ............... B65D 21/0202
52/603
4,708,253 A * 11/1987 Mednis .............. B65D 21/0231
446/124
(Continued)

FOREIGN PATENT DOCUMENTS

CN     212155467 U  * 12/2020
DE       3237096 A1    4/1984
(Continued)

OTHER PUBLICATIONS

Danish Patent and Trademark Office, Search and Examination Report in PA 2018 70721, dated Mar. 29, 2019.
(Continued)

*Primary Examiner* — Aaron R Eastman
(74) *Attorney, Agent, or Firm* — Wood Herron & Evans LLP (57) ABSTRACT

A self-aligning interface for assembling a powertrain housing 210 of a wind turbine onto a support base 220 is provided. The support base 220 comprises a support surface 230 and the powertrain housing 210 comprises a housing surface 240. The support surface 230 and the housing surface 240 are configured to be in contact after assembly. The self-aligning interface comprises: one or more protrusions 250 on the support surface 230, wherein the one or more protrusions 250 comprises one or more walls 260 which are inclined with respect to the support surface 230; and one or more recesses 270 on the housing surface 240. In addition or alternatively, the self-aligning interface comprises one or more protrusions on the housing surface, wherein the one or more protrusions comprises one or more walls which are inclined with respect to the housing surface, and one or more recesses on the support surface. The one or more protrusions 250 are complementary in size and shape to respective ones of the one or more recesses 270, such that, (Continued)

during assembly of the powertrain housing 210 onto the support base 220, the one or more protrusions 250 act as a guide for the one or more recesses 270, and the one or more protrusions 250 fit directly into the respective one or more recesses 270, to enable direct contact between the support surface 230 and the housing surface 240.

24 Claims, 5 Drawing Sheets

(58) Field of Classification Search
CPC ....... Y02E 10/72; Y02P 70/50; B63D 19/385; B63D 21/02; B63D 21/02101; B63D 21/0202; B63D 21/0212
See application file for complete search history.

(56) References Cited

U.S. PATENT DOCUMENTS

| | | | | |
|---|---|---|---|---|
| 4,872,557 | A * | 10/1989 | Ames | B65D 21/0231 |
| | | | | 206/509 |
| 5,133,469 | A * | 7/1992 | Mehta | B65D 21/0202 |
| | | | | 220/675 |
| 7,780,026 | B1 * | 8/2010 | Zuckerman | B65D 21/0223 |
| | | | | 206/508 |
| 10,442,568 | B1 * | 10/2019 | Summers | B65D 55/10 |
| 11,312,609 | B2 * | 4/2022 | Valles | B67D 1/0884 |
| 2008/0190944 | A1 * | 8/2008 | Darr | B65D 21/0202 |
| | | | | 220/660 |
| 2008/0292467 | A1 | 11/2008 | Borgen | |
| 2009/0129923 | A1 | 5/2009 | Achard et al. | |
| 2010/0007150 | A1 * | 1/2010 | Ciszak | F03D 15/10 |
| | | | | 290/55 |
| 2010/0133838 | A1 * | 6/2010 | Borgen | F03D 1/06 |
| | | | | 290/55 |
| 2011/0132790 | A1 * | 6/2011 | Dorn | B65D 21/0202 |
| | | | | 206/509 |
| 2012/0006837 | A1 * | 1/2012 | Becklin | B65D 21/023 |
| | | | | 220/694 |
| 2012/0317929 | A1 * | 12/2012 | Ramberg | B65D 71/70 |
| | | | | 206/427 |
| 2013/0200630 | A1 | 8/2013 | Sharples et al. | |
| 2013/0213841 | A1 * | 8/2013 | Ward | B65D 71/0096 |
| | | | | 206/509 |
| 2014/0227095 | A1 | 8/2014 | Minutin | |
| 2017/0029168 | A1 * | 2/2017 | Olarte | B65D 21/0212 |
| 2018/0362227 | A1 * | 12/2018 | Scanish | B65D 21/0215 |
| 2019/0161225 | A1 * | 5/2019 | Sager | B65D 1/0223 |
| 2020/0332772 | A1 * | 10/2020 | Therkildsen | F03D 80/50 |
| 2021/0188529 | A1 * | 6/2021 | Ohashi | B65D 81/107 |
| 2021/0206532 | A1 * | 7/2021 | Olarte | B65D 21/023 |
| 2022/0069496 | A1 * | 3/2022 | Yi | H01R 12/727 |
| 2022/0110461 | A1 * | 4/2022 | Cosgrove | A47G 1/1613 |
| 2022/0111447 | A1 * | 4/2022 | Hecht | B23B 27/1622 |

FOREIGN PATENT DOCUMENTS

| | | | |
|---|---|---|---|
| DE | 102005001344 A1 | 7/2006 | |
| DE | 102011084154 A1 | 4/2013 | |
| EP | 2620643 A1 * | 7/2013 | ............ F03D 80/30 |
| EP | 2630371 A1 | 8/2013 | |
| EP | 3098443 A1 | 11/2016 | |
| GB | 842244 A | 7/1960 | |
| WO | 03037608 A1 | 5/2003 | |
| WO | 2010005790 A2 | 1/2010 | |
| WO | 2015036018 A1 | 3/2015 | |

OTHER PUBLICATIONS

European Patent Office, International Search Report and Written Opinion in PCT Application Serial No. PCT/DK2019/050300, dated Dec. 12, 2019.

European Patent Office, Decision to Grant in EP Application No. 19789587.3, dated Aug. 3, 2022.

* cited by examiner

SELF-ALIGNING INTERFACE

FIELD OF THE INVENTION

The present invention relates to a self-aligning interface. More specifically, the present invention relates to a self-aligning interface for assembling a powertrain housing of a wind turbine onto a support base, wherein the support base comprises a support surface and the powertrain housing comprises a housing surface, and wherein the support surface and the housing surface are configured to be in contact after assembly.

BACKGROUND OF THE INVENTION

A wind turbine is a device that converts kinetic energy of the wind into electrical energy. At the top of the wind turbine tower, a nacelle comprises equipment for realising the desired energy conversion. A rotor comprising a rotor hub and a number of propeller-like rotor blades is rotatably coupled to the nacelle. The kinetic energy of wind turns the rotor blades (normally two or three). The rotor is connected to the powertrain of the wind turbine, which includes a generator to convert kinetic energy captured by the rotor into electrical energy.

The powertrain of a wind turbine includes several other components such as a main bearing and a gearbox. The powertrain components are installed in the nacelle that is placed on top of the wind turbine tower. The powertrain components are typically contained in a housing or multiple housing components, the housing or components being assembled onto a support base in the nacelle.

Surfaces of the powertrain housing and of the supporting base structure are often provided with a surface treatment such as a thin coating to increase corrosion resistance and prevent damage from pitting. Another important function of the surface treatment may be to increase the surface roughness and therewith the friction between the housing and the support base after assembly. It is very difficult to align and assemble a powertrain component with the support base without disturbing or damaging the surface treatment. Powertrain components tend to be bulky and heavy and the room for manoeuvring inside the nacelle is limited. Thus, it is difficult to gain complete physical control of the powertrain components during assembly. Any disturbance of the surface treatment during assembly may reduce the lifetime of the powertrain components and therefore disadvantageously necessitates more frequent maintenance operations and replacement of powertrain component parts.

Typically, the height of the powertrain above the ground is around 100 to 200 metres. Since powertrain components tend to be heavy, aligning and connecting powertrain components to the base of the wind turbine are tasks that require expensive installation equipment such as a wind turbine crane. Even with such specialist equipment, alignment of powertrain components to the support base can be difficult and time-intensive.

It is an object of the present invention to provide a solution to one or more of the problems mentioned above.

SUMMARY OF THE INVENTION

According to a first aspect of the invention, this object is achieved by providing a self-aligning interface for assembling a powertrain housing of a wind turbine onto a support base, wherein the support base comprises a support surface and the powertrain housing comprises a housing surface, and wherein the support surface and the housing surface are configured to be in contact after assembly. The self-aligning interface comprises one or more protrusions on the support surface, wherein the one or more protrusions comprises one or more walls which are inclined with respect to the support surface, and one or more recesses on the housing surface. In addition, or alternatively, the self-aligning interface comprises one or more protrusions on the housing surface, wherein the one or more protrusions comprises one or more walls which are inclined with respect to the housing surface, and one or more recesses on the support surface. The one or more protrusions are complementary in size and shape to respective ones of the one or more recesses, such that, during assembly of the powertrain housing onto the support base, the one or more protrusions act as a guide for the one or more recesses, and the one or more protrusions fit directly into the respective one or more recesses, to enable direct contact between the support surface and the housing surface.

In a preferred embodiment, the support surface and/or the housing surface comprises a sensitive surface.

The term "sensitive surface" herein is to be understood as a surface prone to damage when it is disturbed and difficult to repair once it has been disturbed. This is in contrast to most surfaces resulting from e.g. a casting process, where a disturbance of the surface would not make any functional difference.

For example, this sensitive surface may be a damage-prone layer of surface treatment material. If the powertrain housing and/or the support base comes into contact with the sensitive surface, either directly at high force or at an angle, the sensitive surface is easily damaged, and scratches and/or dents would appear on the sensitive surface. If the sensitive surface is scratched, or damaged in any other way, it would be difficult to repair the sensitive surface because scratching the sensitive surface would result in a fragmentation of the sensitive surface into multiple fragments which are difficult to manipulate individually. Instead, if the sensitive surface is scratched, the whole damage-prone layer would need to be replaced. In addition, damage to the sensitive surface would be difficult to both detect and access for repair once the powertrain housing has been assembled onto the support base.

In most wind turbines comprising a powertrain housing to be mounted on a support base, the support surface and the housing surface are assembled along a substantially vertical direction, namely by hoisting the power train housing down onto the support base by gravity. Hence, in a preferred embodiment of the present invention, the support surface and the housing surface are assembled along a substantially vertical direction. It is noted that often the rotational axis of the rotor is slightly tilted (5-6°) to keep the blades further avoid from the tower; hence, within this preferred embodiment of the present invention, a substantially vertical direction of movement and the surfaces meeting on a substantially horizontal interface are intended.

The term "support base" herein is to be understood as a main load-carrying base in the lower part of the wind turbine nacelle, typically labelled a "base frame".

A key feature of the self-aligning interface according to the invention is the inclined walls of the protrusions and recesses. The inclined walls cause the opening of each recess to be larger than the peak of each protrusion. This facilitates the alignment of the protrusions with the recesses without risking undesired contacts between the housing surface and the support surface, or between the protrusion and one of said surfaces, during assembly. Because direct contact between the support surface and the housing surface prior to obtaining a precise intended position is prevented, damage to these sensitive surfaces is avoided. Advantageously, this prevents any disturbance or damage of, and therefore provides protection of, the sensitive surface of the support surface and/or the housing surface.

The self-aligning interface according to the invention also allows safer, more efficient and more straightforward installation of a powertrain housing of a wind turbine onto a support base. As the powertrain housing and the support base are brought together for alignment, the one or more protrusions act as a guide for the one or more recesses. Accordingly, the powertrain housing can be mounted onto the support base efficiently and reliably. Reduction of the alignment and assembly time in this way saves time and expenses that would ordinarily be incurred for extensive use of wind turbine assembly and maintenance equipment such as a wind turbine crane.

Furthermore, the shape of the protrusions and recesses—namely, the inclined walls with respect to the housing surface and/or support surface—provides added friction between the walls of the protrusions and the walls of the recesses, thereby providing a strong connection between the powertrain housing and the support base. In addition, the structure resulting from the assembly enables components to be held together under a load without breaking or deforming excessively. The self-aligning interface according to the invention therefore provides improved robustness and structural integrity of the interface between the powertrain housing and the support base. This is particularly important when providing connections for heavy powertrain components because it reduces the frequency of replacement of component parts and improves the lifetime of the powertrain components, support base and the interface itself.

Powertrain components such as a main bearing, a gearbox and a generator are heavy components. The total mass of the powertrain may be within the range of approximately 50 to 150 tons. The self-aligning interface of the present invention may be used in a housing of an individual powertrain component or in a larger housing covering more than one component.

In some embodiments, the powertrain housing may cover one or more powertrain components of the wind turbine such as a main bearing, a gearbox, and a generator. The improved robustness and structural integrity of the interface between the powertrain housing and the support base is particularly important when providing connections for heavy powertrain components such as a main bearing, a gearbox, and a generator.

Ordinarily, such components are bulky and difficult to handle. The present invention facilitates assembly of heavy powertrain components onto the support base.

In some embodiments, the one or more walls of the one or more protrusions may be inclined with respect to the support surface and/or the housing surface at an angle of about 100 to 130 degrees. At these preferred angles, the alignment of the protrusions and recesses is particularly effective because an optimal balance between easy assembly and high friction is obtained. Such an inclination of the walls allows the opening of each recess to be significantly larger than the peak of each protrusion, while providing sufficient friction between the protrusion walls and the recess walls. This provides a strong connection between the powertrain housing and the support base.

The one or more protrusions may comprise a protrusion top and the respective ones of the one or more recesses may comprise a respective recess bottom which is complementary in size and shape to the protrusion top, wherein, after assembly, the protrusion top and the respective recess bottom may define a tolerance gap to ensure direct contact between the support surface and the housing surface. Advantageously, by way of the tolerance gap, direct contact between the support surface and the housing surface is enabled.

In preferred embodiments, the protrusion top and the respective recess bottom each may comprise a flat surface.

The shape of the one or more protrusions and respective ones of the one or more recesses may be selected from a group comprising: frusto-conical, frusto-pyramidal, and a frustum of a sphere.

In some embodiments, the support surface and/or the housing surface comprises a friction enhancement material. The friction enhancement material may provide added friction between the powertrain housing and the support base. The friction enhancement material may also have corrosion-resistant properties.

The support base and the powertrain housing may comprise at least one bore for together receiving a bolt for establishing a secure connection between the powertrain housing and the support base. Providing at least one bore for receiving a bolt enables the powertrain housing and the support base to be connected together securely and fixed in place using simple and inexpensive materials and equipment. The number and pattern of the bolt(s) used for establishing a secure connection between the powertrain housing and the support base may be adapted in dependence on the load impact of the powertrain housing on the support base. For example, if the load impact of the powertrain housing is relatively low, one bolt that is large enough to secure the support base and the powertrain housing together may be used to connect the support base to the powertrain housing. Alternatively, if the load impact of the powertrain housing is relatively high, a collection of several smaller-sized bolts may be used to connect the support base to the powertrain housing. Obviously, large bolts and smaller-sized bolts may be used in any combination alone or together dependent on the desires in the individual configuration.

Preferably, the at least one bore may be provided in the one or more protrusions and the respective one or more recesses. Providing the at least one bore in the protrusions or the recesses, as opposed to for example the support surface or the housing surface, enables more effective load transfer and thus an even more secure connection between the powertrain housing and the support base. This is the reason mainly because providing the at least one bore in the protrusions or recesses does not disadvantageously reduce the surface area of the support surface or the housing surface which often to a high degree is responsible for the load transfer through a friction enhancement coating as explained further below.

In addition, there is provided a nacelle comprising a powertrain housing supported on a support base, a support surface of the support base being in contact with a housing surface of the powertrain housing, and wherein the support surface and the housing surface are in contact. The nacelle is characterized in that the powertrain housing and the support base together comprise a self-aligning interface as described above. In some embodiments, the powertrain housing may be a main bearing housing and the support base may be a base frame.

There is also provided a wind turbine comprising the nacelle described above.

According to a second aspect, there is provided a method of assembling a powertrain housing of a wind turbine onto a support base, using a self-aligning interface as described above. The method comprises guiding the one or more protrusions to fit directly into the respective one or more recesses, to enable direct contact between the support surface and the housing surface.

BRIEF DESCRIPTION OF THE DRAWINGS

The present invention will now be described, by way of example only, with reference to the attached drawings, in which.

DETAILED DESCRIPTION

Figure 1:
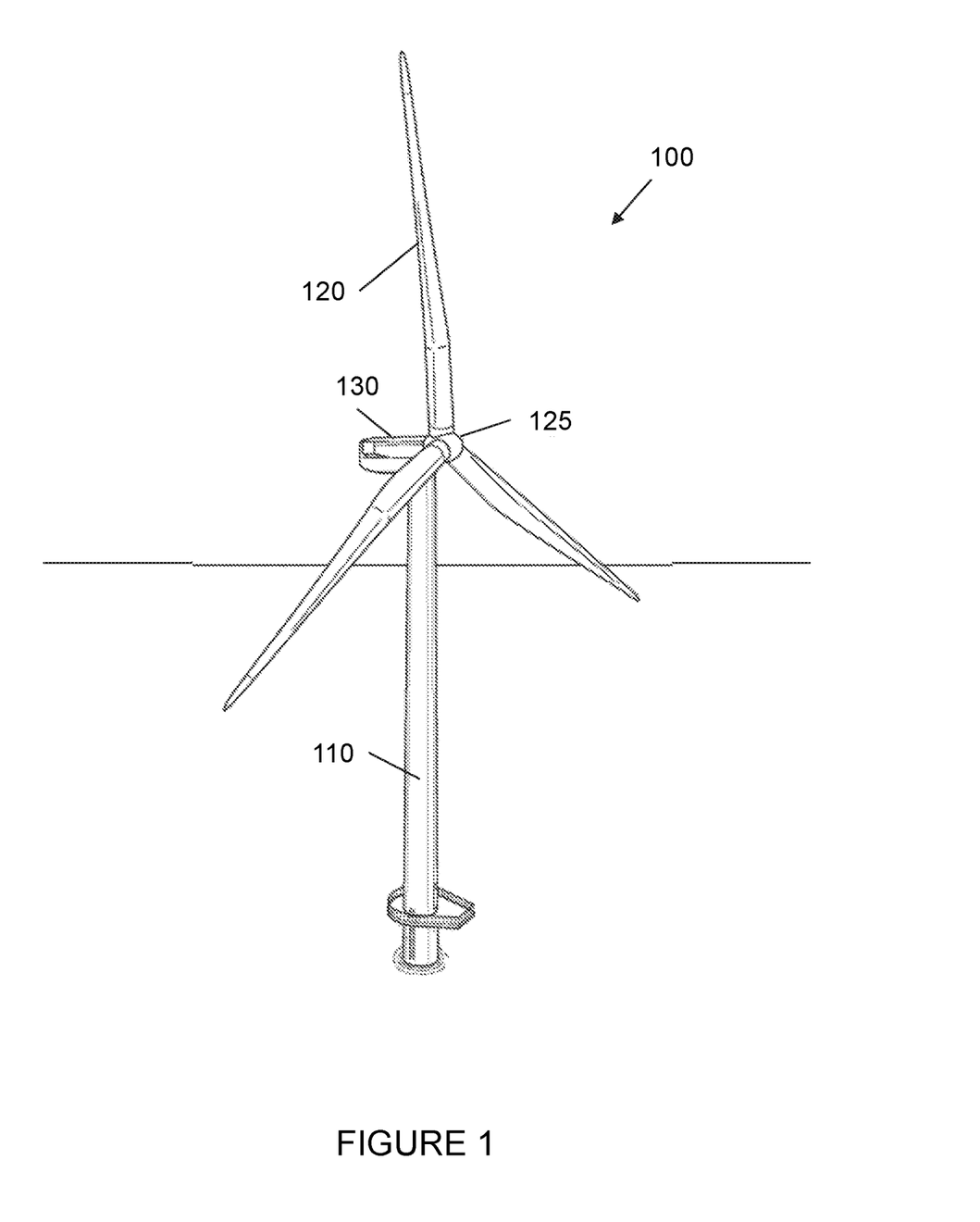
FIG. 1 is a perspective view of a typical wind turbine.

A typical wind turbine 100 is shown in FIG. 1. When active, the wind turbine 100 converts kinetic energy of the wind into electrical energy. The electrical energy can be stored in a battery, fed into a larger electrical grid, or it can be used locally.

In FIG. 1, an offshore wind turbine 100 is shown, but the invention is similarly useful for use with onshore wind turbines. The wind turbine 100 comprises a large wind turbine tower 110 that is typically around 100 to 200 metres high, but may be even taller, whereby the tower 110 is fixed to the ground or into a seabed.

At the top of the wind turbine tower 110, a nacelle 130 is provided that comprises equipment that is needed for realising the desired energy conversion. A rotor comprising a rotor hub 125 and a number of rotor blades 120 is rotatably coupled to the nacelle 130.

In this exemplary wind turbine 100, three rotor blades 120 are used, but rotors with different numbers of rotor blades 120 are also possible.

When active, the kinetic energy of the wind turns the large rotor blades 120. The rotor hub 125 is connected to a powertrain that is provided in the nacelle 130. The powertrain at least comprises a generator for converting the rotational motion of the hub into electrical energy. Typically, the powertrain also comprises other functional parts such as a main bearing supporting the rotor hub and a rotating shaft connected thereto, and a gearbox for increasing the rotational speed of the generator input shaft.

The housing of a powertrain component, otherwise known as powertrain housing, is assembled onto a support base, or base frame, which may be provided internal or external to the nacelle 130 of the wind turbine 100. The support base is connected to wind turbine tower 110.

Figure 2:
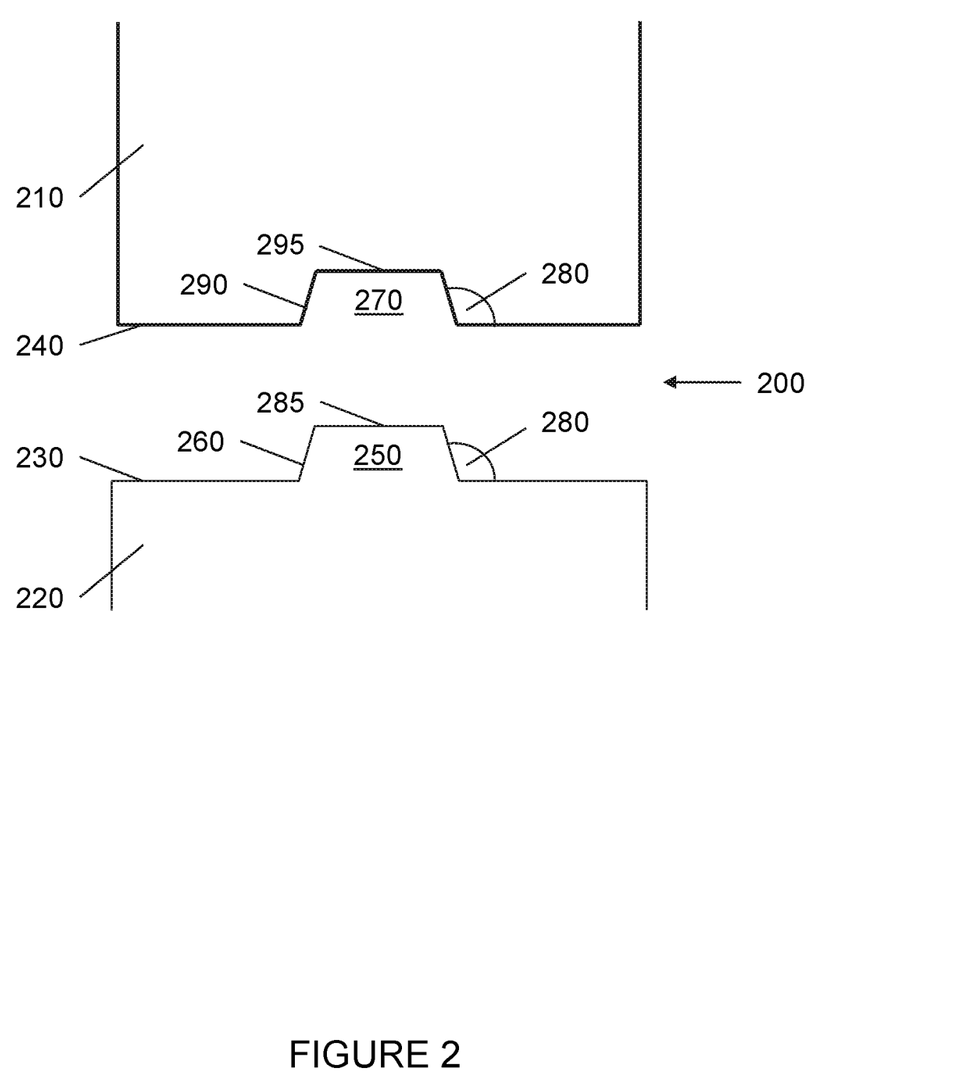
FIG. 2 is a side cross-section view of a self-aligning interface between a powertrain housing and a support base, in accordance with an embodiment of the present invention.

FIG. 2 depicts an exemplary self-aligning interface 200 between a powertrain housing 210 and a support base 220, in accordance with an embodiment of the present invention. The powertrain housing may, for example, be a main bearing housing, a gearbox housing or a generator housing. Alternatively, the housing may cover only part of one of the powertrain components or more than only one component. The support base 220 comprises a support surface 230 and the powertrain housing 210 comprises a housing surface 240. The support surface 230 and the housing surface 240 are configured to be in contact after assembly of the housing 210 onto the base 220.

The support surface 230 and/or the housing surface 240 comprise a sensitive surface. An important function of the sensitive surface is to adjust the friction between these surfaces, typically by adjusting or increasing the surface roughness. Without the protrusion(s)/recess(es) of the present invention, the full load transfer between the support surface 230 and the housing surface 240 needs to occur through friction. Obviously, the bolts gathering these will also assist in load transfer by themselves, but for the bolts it will typically mostly be through assisting in holding the surfaces tightly together such that friction of the surfaces is kept at maximum. With the protrusion(s)/recess(es) of the present invention, some load transfer may be done via these; however, the load transfer via the friction of the surfaces is still important.

In order to obtain a good friction, the sensitive surface may have been treated to a desired surface roughness. This may, for example, be done by cleaning by shot-blasting the surface to achieve a desired surface roughness. Afterwards typically a coating process may occur with a surface treatment material using a thermal spraying technique. This surface treatment material may for instance be a corrosion protection layer. In other embodiments, the sensitive surface gets a desired surface roughness through individual friction plates which may be used alone or in combination with other means described herein.

The sensitive surface of the support and/or housing surfaces may, for example, comprise a thin coating to increase corrosion resistance and prevent damage from pitting. The thickness of the added surface layer is dependent on the material that is used and the function it has to fulfil. The surface treatment material may be a metal coating, such as a Zinc coating (for example, $Zn^{99,95}$), where the layer may be approximately between 50 and 90 micrometres in thickness. Alternatively, the surface treatment material may be a Zinc Aluminium alloy (for example, $Zn^{85}Al^{15}$), where the layer may be approximately between 50 and 175 micrometres in thickness.

The self-aligning interface 200 comprises a protrusion 250 on the support surface 230. A protrusion is a discontinuity in the otherwise smooth support surface that sticks out beyond that surface. Only one protrusion is shown on the support surface of FIG. 2; however, the support surface may comprise more than one protrusion. For example, the housing 210 may be supported on the base 220 at four feet (one per corner), each having one, two or more protrusions 250.

The protrusion 250 comprises protrusion walls 260 which are inclined with respect to the support surface 230. The protrusion walls 260 are inclined with respect to the support surface 230 at an obtuse angle 280. The protrusion walls 260 may be inclined with respect to the support surface at an angle within a preferred angle range of about 100 to 130 degrees. Adopting an angle within this preferred angle range enables the protrusion and the respective recess to align particularly well whilst providing added friction between the housing and the base after assembly. The alignment of the protrusions and recesses is particularly effective because the inclination of the walls enables the opening of each recess to be larger than the peak of each protrusion. At the same time, the protrusion walls inclined to an angle within the preferred angle range provides added friction between the protrusion walls and the recess walls, thereby providing a strong connection between the powertrain housing and the support base.

For every protrusion 250 on the support surface, a recess 270, which is complementary in size and shape to the protrusion 250, is provided on the housing surface 240. A recess is a discontinuity in the otherwise smooth housing surface that forms a hollow space extending into that surface. Accordingly, the recess 270 has recess walls 290, where the recess walls 290 are inclined with respect to the housing surface 240 at the same obtuse angle 280 as the protrusion walls 260 are inclined with respect to the support surface 230.

The protrusion 250 is complementary in size and shape to the respective recess 270, such that, during assembly of the powertrain housing 210 onto the support base 220, the protrusion 250 acts as a guide for the recess 270. The protrusion 250 fits directly into the recess 270, to enable direct contact between the support surface 230 and the housing surface 240.

The protrusion 250 comprises a protrusion top 285 connected to the protrusion walls 260. The recess 270 comprises a recess bottom 295 which is complementary in size and shape to the protrusion top 285. In this example, the protrusion top 285 and the recess bottom 295 each comprise a flat surface. The protrusion top 285 and the recess bottom 295 may be arranged to be in contact at the interface 200 after assembly. However, the recess depth is preferably slightly larger than the protrusion height in order to allow for some manufacturing tolerances without running the risk that the support surface 230 and the housing surface 240 are not in full contact after assembly.

Figure 3:
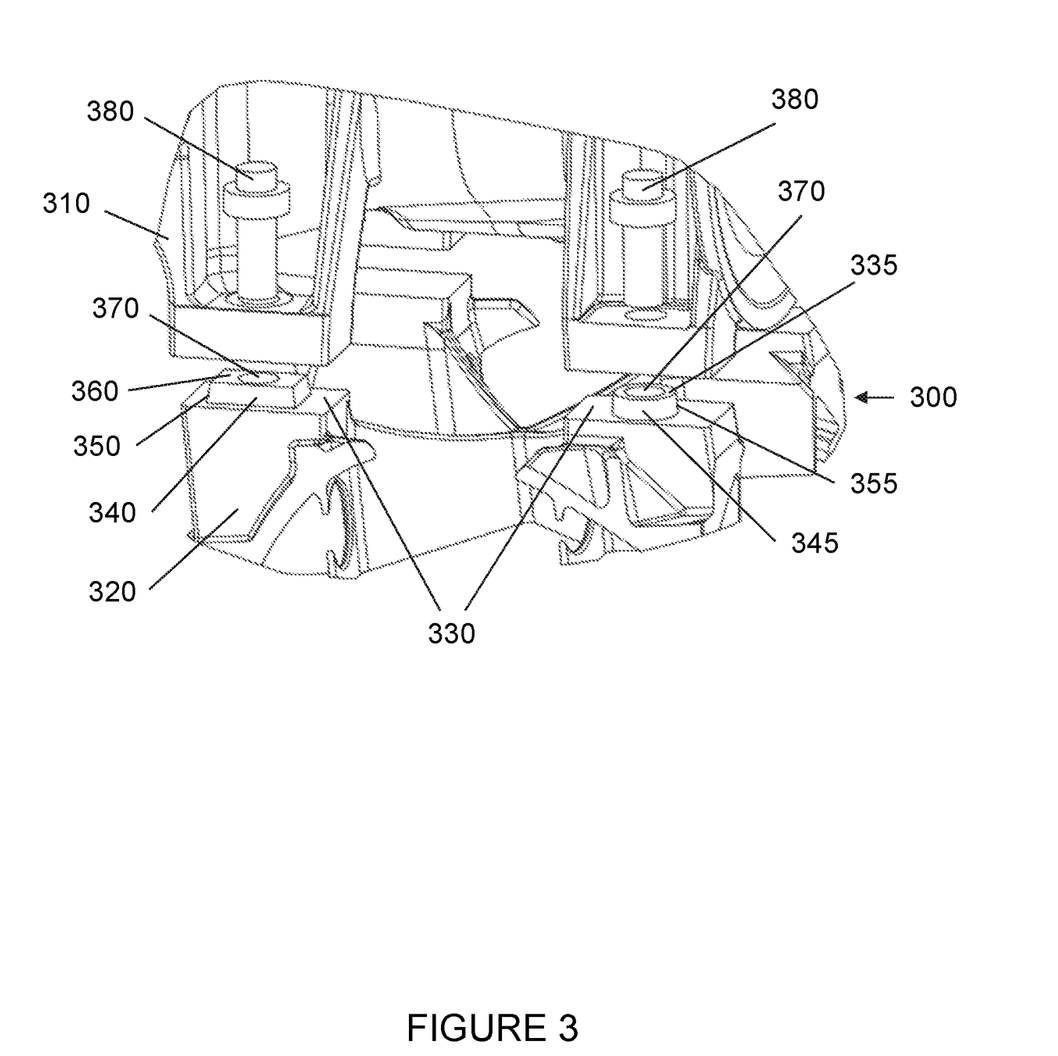
FIG. 3 is a perspective view of a connection between a main bearing housing and a base frame of a wind turbine, showing the support surfaces of the base frame on which the main bearing housing is supported.
Figure 4:
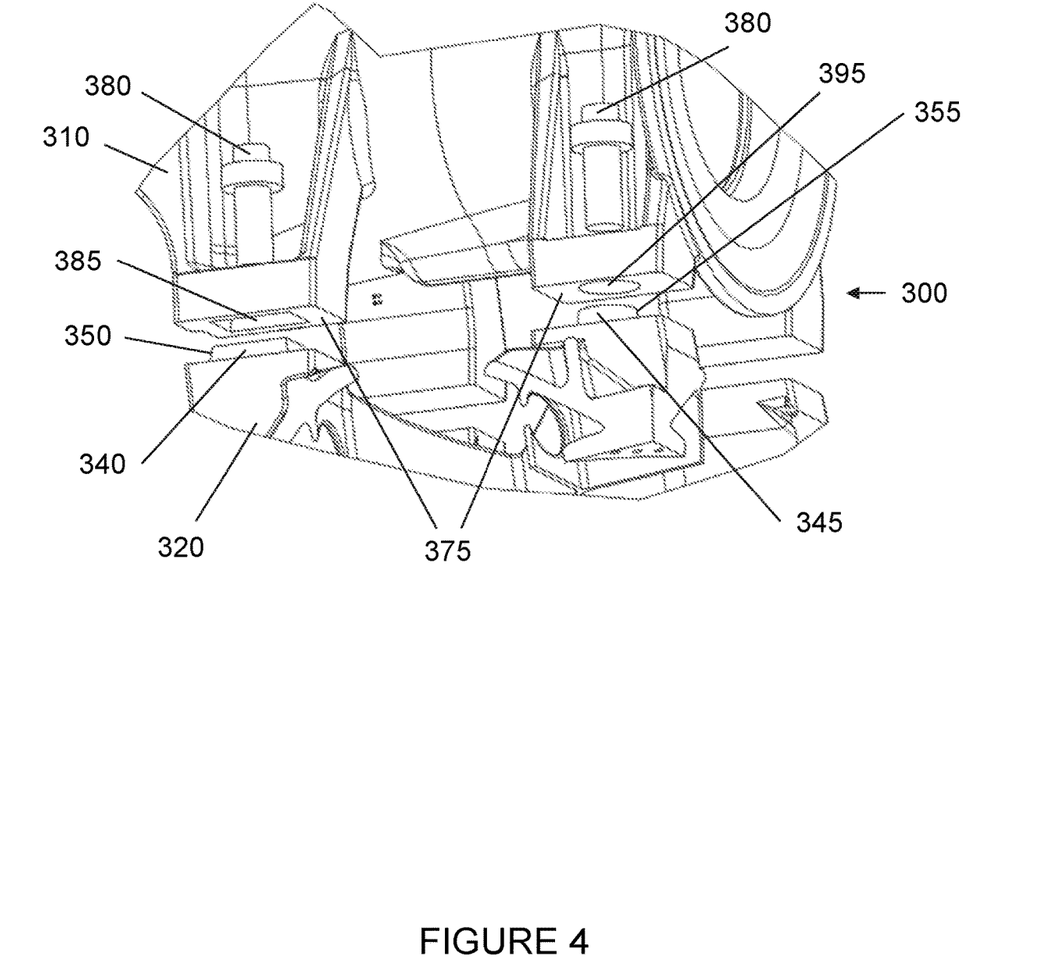
FIG. 4 is a perspective view of the connection of FIG. 3, between the main bearing housing and the base frame of a wind turbine, showing the surfaces of the main bearing housing which are supported by the base frame.

FIG. 3 and FIG. 4 show another exemplary self-aligning interface 300 between the main bearing housing 310 and the base frame 320 of a wind turbine, in accordance with an embodiment of the present invention. The base frame 320 comprises support surfaces 330 and the main bearing housing 310 comprises main bearing housing surfaces 375. The main bearing housing 310 is supported on the support surfaces 330 of the base frame 320.

Protrusions 340, 345 are provided on each of the support surfaces 330. The first protrusion 340 comprises protrusion walls 350 which are inclined with respect to the support surface 330, at an obtuse angle. The inclination of the protrusion walls 350 is such that the walls are in continuous contact with the support surface 330. The first protrusion 340 comprises a protrusion top 360 connected to the protrusion walls 350. The first protrusion 340 is frusto-pyramidal in shape.

The second protrusion 345 comprises a protrusion wall 355 which is inclined with respect to the support surface 330, at an obtuse angle. The inclination of the protrusion wall 355 is such that the wall is in continuous contact with the support surface 330. The second protrusion 345 comprises a protrusion top 335 connected to the protrusion wall 355. The second protrusion 345 is frusto-conical in shape.

The main bearing housing 310 provides a first recess 385, which is complementary in size and shape to the first protrusion 340, and a second recess 395, which is complementary in size and shape to the second protrusion 345. Accordingly, the recesses 385, 395 comprise recess walls which are inclined with respect to the main bearing housing surfaces 375 at the same obtuse angle as the respective protrusion walls 350, 355 are inclined with respect to the support surfaces 330.

The protrusions 340, 345 are complementary in size and shape to the respective recesses 385, 395, such that, during assembly of the main bearing housing 310 onto the base frame 320, the protrusions 340, 345 act as a guide for the respective recesses 385, 395.

The respective recesses 385, 395 each comprise a recess bottom (not shown) which is complementary in size and shape to the respective protrusion tops 360, 335. The protrusion tops 360, 335 and the recess bottoms are arranged to be in contact at the interface 300 after assembly.

The protrusions 340, 345 fit directly into the respective recesses 385, 395, to enable direct contact between the support surfaces 330 and the main bearing housing surfaces 375. This prevents disturbance of the surface treatment material layer on the support surfaces 330 and housing surfaces 375 during installation. The opening of the recesses 385, 395 is larger than the surfaces of the protrusion tops 360, 335, making it relatively easy to bring the top of the protrusions 340, 345 into the recesses 385, 395 without damaging the surface layers of the main bearing housing. When lowering the main bearing housing, the protrusions 340, 345 move further into the recesses 385, 395 and the inclined walls of the protrusions 340, 345 guide the inclined walls of the recesses while leaving the sensitive support surfaces 330 and main bearing housing surfaces 375 intact. When assembled, a tolerance gap may be left between the protrusion tops 360, 335 and the respective recess bottoms to ensure direct contact between the support surfaces 330 and the main bearing housing surfaces 375, such that the sensitive surfaces are undisturbed during and after assembly.

Once the main bearing housing 310 and the base frame 320 are aligned, the connection between the two components may be secured by way of bolts 380. The protrusions 340, 345 each comprise a cylindrical bore 370. The respective recesses 350, 355 each comprise a bore corresponding to the bores 370 in the protrusions 340, 345. The bolts 380 are arranged to fit through the cylindrical bores 370. This enables a secure connection between the main bearing housing 310 and the base frame 320 to be established. It is to be noted that the bolt and the respective bore through with the bolt fits may be any suitable shape such as, for example, conical or pyramidal.

Figure 5:
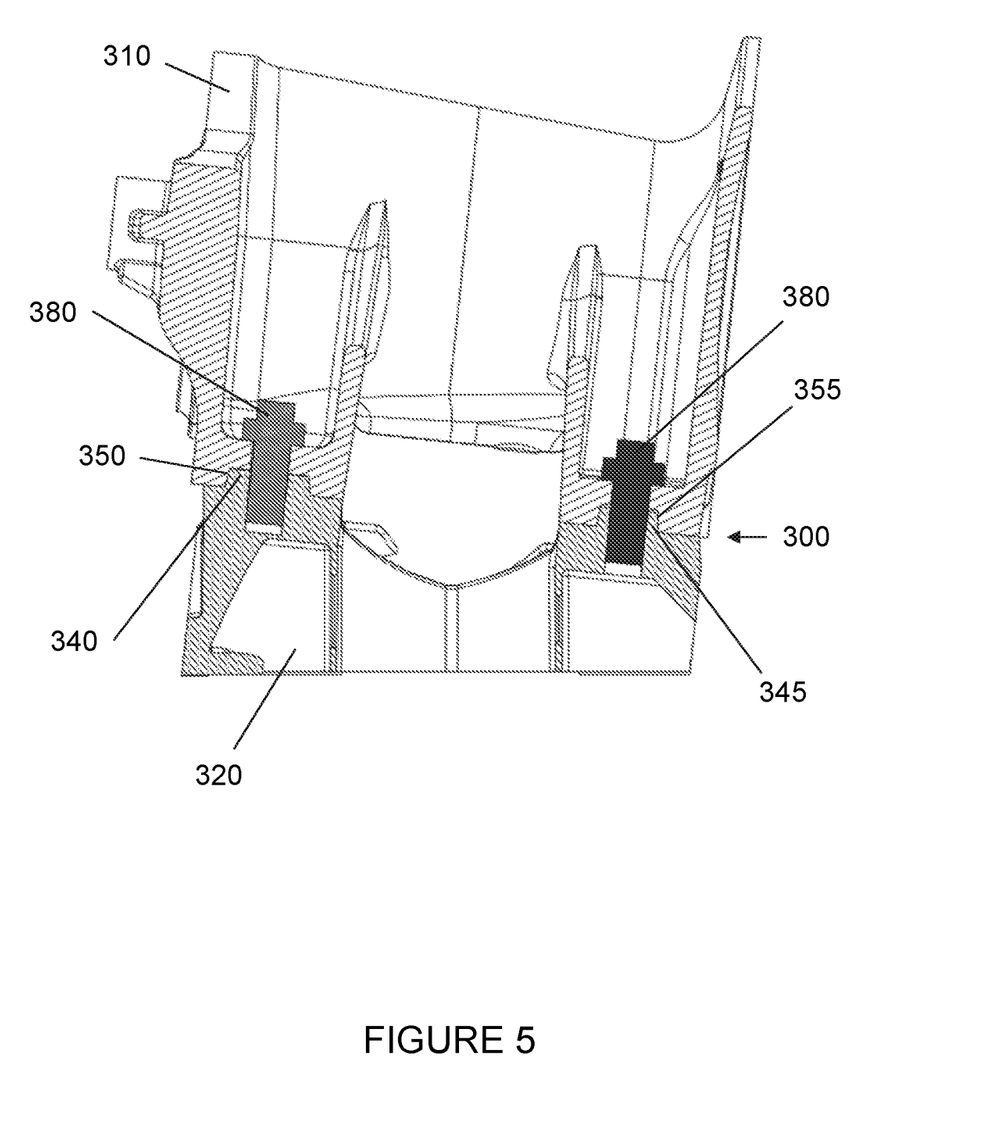
FIG. 5 is a side cross-section view of the connection between the main bearing housing and the base frame of a wind turbine.

FIG. 5 shows the connection between the main bearing housing 310 and the base frame 320, after assembly and installation of bolts 380. An advantage of fitting one or more bolts 380 through one or more respective bores in the protrusions 340, 345 and the respective recesses 350, 355 is that the main bearing housing 310 can be fitted to the base frame 320 without disturbing any of the sensitive surfaces. When fitted, the bolt 380 does not contact either the housing surfaces 375 or the support surfaces 330. In addition, since the bolt 380 is fitted through the bore 370, it allows friction between the main bearing housing 310 and the base frame 320 to be enhanced because the bolt does not interfere with the sensitive surface area around the protrusions 340, 345 and recesses 385, 395.

Additional bores and respective bolts may be fitted at intervals along the main bearing housing and the base frame. The bores and bolts may be arranged in patterns to maximise the security of the connections between the main bearing housing and the base frame. The bores and bolts may also be used on areas of the main bearing housing or the base frame where no sensitive surface such as surface treatment layer is present. For example, several bores may be located on untreated contact areas of the base frame and the main bearing housing at regular intervals, following by several bores on each of several protrusions or recesses on the base frame and the main bearing housing. In this example, bolts can be used to secure the main bearing housing to the base frame by fitting a bolt through each of the bores that are located on the base frame and the main bearing housing. This enables a connection with improved security, stability and connection.

Many modifications may be made to the specific examples described above without departing from the scope of the invention as defined in the accompanying claims. Features of one embodiment may also be used in other embodiments, either as an addition to such embodiment or as a replacement thereof.

For example, the powertrain housing may comprise one or more powertrain components of the wind turbine such as a main bearing housing, a gearbox, and a generator. In one embodiment, the powertrain of the system may be a cantilevered arrangement in which a generator is mounted directly on a gearbox, which in turn is mounted directly on the main bearing housing from the rear side. Further, the rotor (i.e. hub and blades) is mounted directly on the main bearing housing from the front side. Thus, all loads from the system are transferred through the main bearing housing and consequently through the self-aligning interface according to embodiments of the present invention. In particular for such embodiment it is highly important to have a good load transfer through the self-aligning interface.

The shape of the one or more protrusions and respective ones of the one or more recesses may, alternatively to frusto-pyramidal or frusto-conical, be in the shape of a frustum of a sphere. In this example, the protrusions and respective recesses have curved walls. The walls of the protrusions and recesses may be stepped, such that a series of steps are formed on the walls. Alternatively, the inclined walls may not form a uniform shape around the protrusion or recess. The inclined walls may instead be partly frusto-conical and partly in the shape of a frustum of a sphere. All of the one or more walls of the one or more protrusions may be inclined with respect to the support surface and/or the housing surface. Alternatively, one or more of the walls may be perpendicular to the support surface and/or the housing surface, with one or more of the walls being inclined with respect to the support surface and/or the housing surface.

In the above examples, one or more protrusions are provided on the support surface of the support base and one or more complementary recesses are provided on the housing surface of the powertrain housing. The skilled person would understand that the self-aligning interface according to the present invention may comprise one or more protrusions on the housing surface of the powertrain housing, wherein the one or more protrusions on the housing surface may comprise one or more walls which are inclined with respect to the housing surface. The skilled person would also understand that the self-aligning interface may comprise one or more recesses on the support surface of the support base.

The invention claimed is:

1. A self-aligning interface for assembling a powertrain housing of a wind turbine onto a support base, wherein the support base comprises a support surface and the powertrain housing comprises a housing surface, wherein the support surface and the housing surface are configured to be in contact after assembly, the self-aligning interface comprising:

one or more protrusions on the support surface, wherein the one or more protrusions comprises one or more walls which are inclined with respect to the support surface; and one or more recesses on the housing surface, wherein the one or more recesses comprises one or more walls which are inclined with respect to the housing surface; and/or;

one or more protrusions on the housing surface, wherein the one or more protrusions comprises one or more walls which are inclined with respect to the housing surface; and one or more recesses on the support surface, wherein the one or more recesses comprises one or more walls which are inclined with respect to the support surface;

wherein the one or more protrusions are complementary in size and shape to respective ones of the one or more recesses such that, during assembly of the powertrain housing onto the support base, the one or more protrusions act as a guide for the one or more recesses, and the one or more protrusions fit directly into the respective one or more recesses such that the one or more walls of the one or more recesses completely surround the one or more walls of the one or more protrusions and to enable direct contact between the support surface and the housing surface, and wherein the one or more protrusions and the one or more recesses are configured to interact so as to permit relative movement between the powertrain housing and the support base in a substantially vertical direction and prevent relative movement between the powertrain housing and the support base in a direction perpendicular to the substantially vertical direction.

2. The self-aligning interface of claim 1, wherein the support surface and/or the housing surface comprises a surface treatment.

3. The self-aligning interface of claim 1, wherein said support surface and said housing surface have been assembled along a substantially vertical direction.

4. The self-aligning interface of claim 1, wherein the powertrain housing covers one or more powertrain components of the wind turbine selected from a group comprising: a main bearing, a gearbox, and/or a generator.

5. The self-aligning interface of claim 1, wherein the one or more walls of the one or more protrusions are inclined with respect to the support surface and/or the housing surface at an angle of 100 degrees to 130 degrees.

6. The self-aligning interface of claim 1, wherein the one or more protrusions comprise a protrusion top and the respective ones of the one or more recesses comprise a respective recess bottom which is complementary in size and shape to the protrusion top, wherein, after assembly, the protrusion top and the respective recess bottom define a tolerance gap to ensure direct contact between the support surface and the housing surface.

7. The self-aligning interface of claim 6, wherein the protrusion top and the respective recess bottom each comprise a flat surface.

8. The self-aligning interface of claim 1, wherein the shape of the one or more protrusions and respective ones of the one or more recesses is selected from a group comprising: frusto-conical, frusto-pyramidal, and a frustum of a sphere.

9. The self-aligning interface of claim 1, wherein the support surface and/or the housing surface comprises a friction enhancement material.

10. The self-aligning interface of claim 1, wherein the support surface and/or the housing surface comprises a coating to increase corrosion resistance and prevent damage from pitting.

11. The self-aligning interface of claim 1, wherein the support surface and/or the housing surface is a surface which has undergone a surface treatment to increase the surface roughness.

12. The self-aligning interface of claim 1, wherein the support surface and/or the housing surface is a surface which has undergone a coating process with a surface treatment material using a thermal spraying technique.

13. The self-aligning interface of claim 12, wherein the surface treatment material comprises a corrosion protection layer.

14. The self-aligning interface of claim 12, wherein the surface treatment material comprises a Zinc coating with a thickness between 50 and 90 micrometres.

15. The self-aligning interface of claim 12, wherein the surface treatment material comprises a Zinc Aluminum alloy with a thickness between 50 and 175 micrometres.

16. The self-aligning interface of claim 1, wherein the support surface and/or the housing surface comprises individual friction plates.

17. The self-aligning interface of claim 1, wherein the support base and the powertrain housing comprise at least one bore for together receiving a bolt for establishing a secure connection between the powertrain housing and the support base.

18. The self-aligning interface of claim 17, wherein the at least one bore is provided in the one or more protrusions and the respective one or more recesses.

19. A nacelle comprising a powertrain housing supported on a support base, a support surface of the support base being in contact with a housing surface of the powertrain housing, wherein the support surface and the housing surface are in contact, the nacelle being characterized in that the powertrain housing and the support base together comprise a self-aligning interface according to claim 1.

20. A nacelle as claimed in claim 19, wherein the powertrain housing is a main bearing housing and the support base is a base frame.

21. A nacelle as claimed in claim 19, wherein the powertrain housing is a main bearing housing and the support base is a base frame;
wherein said main bearing housing is coupled to a gearbox and a generator such that all loads from said gearbox and generator are transferred through said self-aligning interface.

22. A wind turbine comprising the nacelle of claim 19.

23. A method of assembling a powertrain housing of a wind turbine onto a support base, using a self-aligning interface according to claim 1, the method comprising guiding the one or more protrusions to fit directly into the respective one or more recesses, to enable direct contact between the support surface and the housing surface.

24. The method of claim 23, wherein said support surface and said housing surface have been assembled along a substantially vertical direction.

\* \* \* \* \*